United States Patent [19]

Janik et al.

[11] Patent Number: 4,976,852
[45] Date of Patent: Dec. 11, 1990

[54] FUEL FILTER

[75] Inventors: Leon P. Janik, Suffield; M. Craig Maxwell, Colchester, both of Conn.

[73] Assignee: Stanadyne Automotive Corp., Windsor, Conn.

[21] Appl. No.: 372,645

[22] Filed: Jun. 28, 1989

[51] Int. Cl.$^5$ ............................................. B01D 27/08
[52] U.S. Cl. ..................................... 210/86; 210/181; 210/305; 210/307; 210/312; 210/314; 210/335; 210/437; 210/450; 210/454; 210/493.1; 210/DIG. 5
[58] Field of Search .......................... 210/94, 181–183, 210/185, 232, 299, 305–307, 314, 316, 335, 437, 450, 454, 493.1, 493.2, DIG. 5, DIG. 17, 86, 312, 313

[56] References Cited

U.S. PATENT DOCUMENTS

| 3,144,407 | 8/1964 | Olmos | 210/307 |
| 3,312,350 | 4/1967 | Kasten | 210/307 |
| 3,465,883 | 9/1969 | Jumper | 210/307 |
| 4,372,847 | 2/1983 | Lewis | 210/DIG. 5 |
| 4,465,595 | 8/1984 | Cooper | 210/DIG. 17 |
| 4,502,955 | 3/1985 | Schaupp | 210/DIG. 5 |
| 4,502,956 | 3/1985 | Wilson et al. | 210/312 |
| 4,510,051 | 4/1985 | Diry | 210/185 |
| 4,836,923 | 6/1989 | Popoff et al. | 210/454 |

Primary Examiner—W. Gary Jones
Assistant Examiner—Matthew D. Savage

[57] ABSTRACT

A fuel filter assembly employs a base which mounts a disposable filter element cartridge and includes a sump for collecting water removed from the filtering unit. The cartridge includes a dual stage filter system wherein fuel flows axially to an upper filter element for removing particulate matter and coalescing water droplets and axially to a secondary filter stage which functions as a water barrier. The filtered fule flows axially downwardly and through an outlet passage from the base. The water collected in the sump is removed through a drain cock.

20 Claims, 5 Drawing Sheets

FUEL FILTER

BACKGROUND OF THE INVENTION

This invention relates generally to devices for filtering and separating liquids. More particularly, the present invention relates to fuel filters for removing foreign particles and separating water from fuel of the fuel supply system of an internal combustion engine.

The absence of high standards of quality control in diesel fuel supplies dictates that an effective fuel filter be incorporated into the fuel supply system for a diesel engine. It is not uncommon for diesel fuel to have significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

Diesel fuel also contains a waxy constituent which precipitates as wax crystals when the fuel temperature drops below a chacteristic "cloud point". In cold weather conditions, the precipitating wax crystals can rapidly plug a fuel filter and thereby cut off fuel delivery to the internal combustion engine.

A number of conventional fuel filters perform the dual function of removing particulate material from the diesel fuel and separating water from the fuel. In addition, conventional fuel filter units or fuel conditioners frequently employ heaters to prevent wax crystal formation. Commonly, the fuel filters employ a disposable filter cartridge which is replaced at pre-established intervals of filter usage.

U.S. Pat. No. 4,491,120 assigned to the assignee of the present invention, discloses a fuel conditioner to which the present invention relates. A disposable filter/water separator cartridge is releasably secured to a base. A multi-stage filter assembly within the cartridge includes filtering and coalescing media and separates an upper portion of the chamber from a lower portion which functions as a water collection sump. A heater mounted in the base warms the fuel before the fuel enters the cartridge. The fuel conditioner also features sensing devices in the base to indicate the presence of a predetermined quantity of water in the sump and the occurrence of a plugged filter condition. A priming pump is also manually operable to restore the fuel conditioner to operational condition after the cartridge replacement.

SUMMARY OF THE INVENTION

Briefly stated, the invention in a perferred form is a fuel filter assembly which includes a base and a disposable filter cartridge which is mounted to the base. The base includes a fuel inlet passage, a fuel outlet passage, a central first conduit which interiorly defines a first axial passage communicating with the inlet passage, and a second conduit which surrounds the first conduit and defines a second axial passage which communicates with the outlet passage. The base also forms a sump which collects water separated from the fuel. The cartridge comprises a container-like housing. A primary filter unit enclosed in the housing comprises a pleated primary filter element defining a first chamber which communicates with the first axial passage and a second chamber surrounding the first chamber. A secondary filter element extends exteriorly from the housing. The base and secondary filter element cooperates to define a third chamber and an inner fourth chamber. The fourth chamber is surrounded by the third chamber. The fourth chamber communicates with the second axial passage.

The first and second axial passages are preferably coaxial. The housing also includes a first endcap and a first sealing grommet surrounding an opening for fluidly sealing the endcap with the first conduit. A second endcap axially spaced from the first endcap mounts a second sealing means for fluidly sealing the second endcap to the second conduit. The secondary filter element is disposed between the first and second endcaps. The first endcap also has a plurality of angularly spaced apertures which provide fluid communication between the second and third chambers.

A heating unit comprising a heat rod extending axially in the first conduit is employed for heating fuel. The secondary filter element is impervious to the passage of water. The primary filter element contains water coalescing properties which results in the formation of water droplets in the second chamber.

The inlet passage has an inlet port and the outlet passage has an outlet port. The ports are located at diametrically opposed locations of the base. The sump has a pair of sump sections with the inlet and outlet passages being disposed between the sump sections. A water level sensor is disposed in the sump. A drain cock is also disposed in the sump for draining collected water from the filter assembly.

A fuel filter cartridge in accordance with the invention includes a container which forms a housing. A continuous fan-shaped, pleated primary filter element is disposed in the housing. The primary filter element has water coalescing properties and defines a central inner region on one side of the element and an outer region on the opposite side of the element. An endcap connects at one end of the housing and encloses the primary element. The endcap defines a central opening. A sealing grommet is mounted in the opening for fluidly sealing a conduit which is received through the opening.

A secondary filter element disposed axially from the primary filter element is located exteriorly of the housing. The secondary filter element is impervious to the passage of water and defines a central inner region. A second endcap encloses an axial end of the secondary filter element. The endcap defines a central opening which is coaxial with the first opening. A sealing grommet is received in the second opening for fluidly sealing a second conduit which is received through the second opening. The first endcap has a plurality of angularly spaced apertures. Both the first and second filter elements have a fan-shaped pleated configuration. The first endcap comprises a plate which is bent to form a first shoulder which engages peripheral edge proportions of the first element and a second shoulder of smaller diameter which engages peripheral edge proportions of the second element.

An object of the invention is to provide a new and improved fuel filter adaptable for use in filtering the fuel supplied to a diesel engine.

Another object of the invention is to provide a new and improved fuel filter of efficient low cost construction which provides an effective and efficient means for filtering particulate matter from the fuel and for removing water from the fuel.

A further object of the invention is to provide a new and improved fuel filter having a disposable cartridge element incorporating a dual stage filter assembly.

Other objects and advantages of the invention will become apparent from the drawings and the specification.

DETAILED DESCRIPTION OF THE INVENTION

Figure 1:
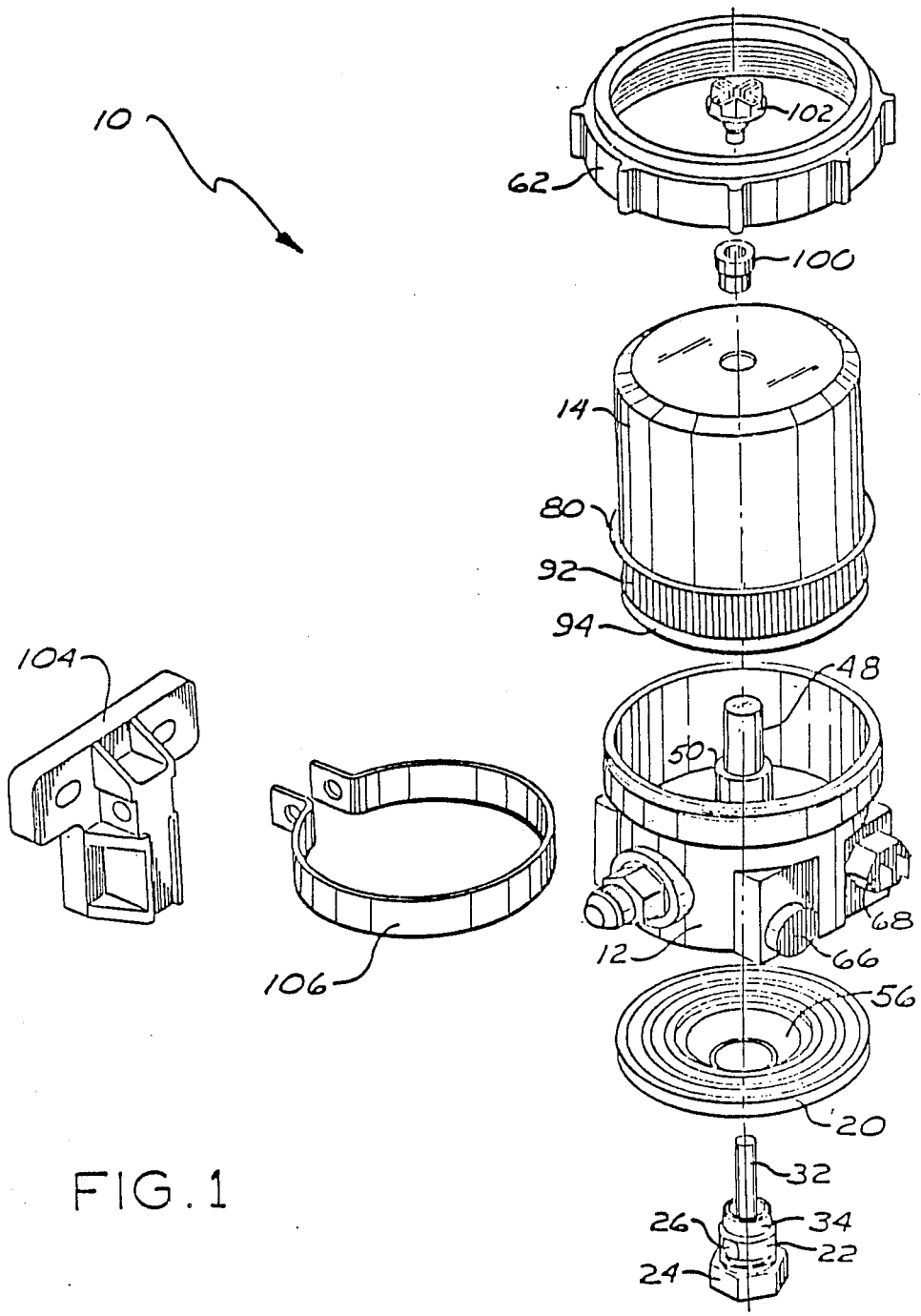
FIG. 1 is an exploded view of a fuel filter assembly in accordance with the present invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The fuel filter assembly is especially adapted for incorporation into the fuel supply system of an internal combustion engine (not illustrated) such as a diesel engine for removing particulate manner from the fuel and for separating water from the fuel. In addition, the fuel filter assembly 10 includes a heater for heating the fuel during cold conditions to prevent the precipitation of wax crystals from the fuel.

The base 12 rests on a header endcap 20 which has an opening through which an electric fuel heater 22 is inserted. Electric fuel heater 22 includes an integral endcap bolt 24 and an opening 26 which leads to an internal chamber 28 via a check valve 30. A heating rod 32 projects axially from the fuel heater bolt 24. The fuel heater contains an intermediate threaded surface 34 which threads into a complementary threaded portion of the base 12 for mounting the base to the header endcap 20. Seal rings 36 and 38 are mounted in annular grooves of the header endcap for sealing the base with the endcap.

Base 12 is a quasi-cup-like member which includes an interior diametral shoulder 40. The shoulder 40 separates the lower portion of the base into a pair of sumps 42 and 44 for collecting water which is separated from the fuel by the filter assembly. A transverse passage 43 through shoulder 40 connects sumps 42 and 44. A central stepped bore 46 extends axially through the shoulder. The bore 46 has a threaded opening at the lower interior portion for threading with the heater element 22.

A sleeve 48 having an intermediate integral locating ring 51 is closely partially received in a reduced segment of the bore 46. The diameter of the sleeve is greater than the diameter of the heating rod 32 of the heater element and extends in coaxial relationship with sleeve 48 so as to radially enclose the heating rod 32. The upper segment of the bore 46 has an enlarged diameter. A second sleeve 50 is closely received in the enlarged bore portion in concentric relationship with sleeve 48. Sleeve 50 has an intermediate integral locating ring 53 and has a reduced axial length in comparison to that of sleeve 48. An annular axial passage 49 is formed between sleeves 48 and 50. Sleeves 48 and 50 function as axial fluid conduits.

A fuel inlet passage 52 includes a threaded female connector 54. The fuel inlet passage extends radially and axially in the shoulder and opens through an annular recess 56 in the endcap 20. A fuel outlet passage 58 extends radially in general alignment with fuel inlet passage 52. An enlarged annulus surrounding the inner sleeve 48 in axial communication with passage 49 (defined between sleeves 48 and 50) leads to the outlet passage 58. The fuel outlet passage includes a threaded female connector 59 for connecting with an outlet fuel line.

A threaded surface at the upper peripheral portion of the base is configured for threaded engagement with a retaining collar 62 for securing the disposable filter cartridge 14 to the base 12. An upper circumferential lip 64 of the base is engaged by the underside of the cartridge 14.

A drain cock 66 and a water sensor 68 are threaded into the side of the base for interior communication with sump 42. The water level sensor 68 electrically communicates with the compartment of the vehicle for indicating that the water level has reached a pre-established level so that the water can be manually drained from the sumps by rotatably loosening the drain cock 66.

Figure 5:
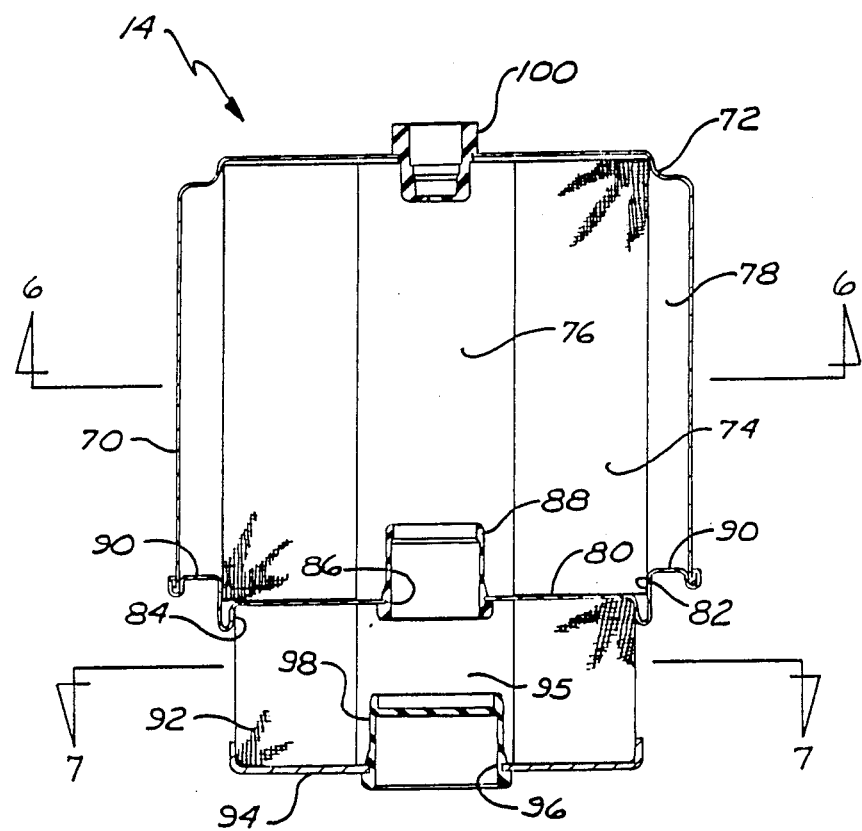
FIG. 5 is a sectional view of the cartridge portion of the fuel filter assembly of FIG. 1.
Figure 6:
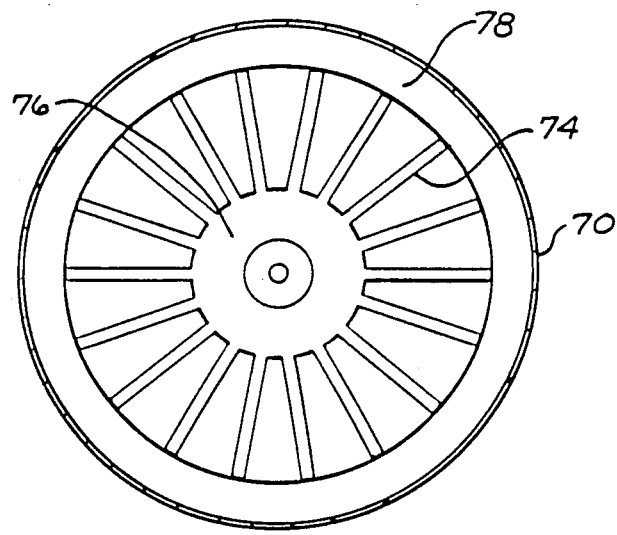
FIG. 6 is a sectional view of the filter cartridge taken along the line 6—6 of FIG. 5.
Figure 7:
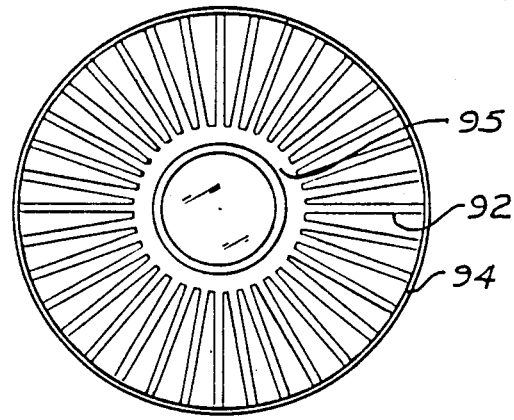
FIG. 7 is a sectional view of the filter cartridge taken along the line 7—7 of FIG. 5.

With additional reference to FIG. 5, the disposable filter cartridge 14 comprises a can-like container 70 which is configured to have an upper peripheral recessed indentation 72. A primary stage filter element 74 having a continuous fan-shaped a pleated form is received in the container. The filter element 74 axially extends slightly below the bottom of the side wall of the container. The primary filter element thus defines an interior central axial chamber 76 and quasi-annular outer chamber 78. The primary filter element is affixed with resin binders or other water coalescers so that as the fuel passes from the passage 76 through the filter element 74 to chamber 78, the water coalesces to form water droplets in the coalescing chamber 78.

A primary stage endcap 80 encloses the primary filter element and is roll seamed against the bottom edge portions of the container. The endcap 80 is folded so as to have an inner annular retaining shoulder 82 which engages the lower portion of the filter element 74 for locating the element. The endcap 80 also defines at an inner underside location an annular retaining shoulder 84 which is generally coaxial with shoulder 82 and has a smaller diameter than shoulder 82. A central circular opening 86 through the endcap receives an elastomeric sealing element 88 which is dimensioned to fluidly seal against sleeve 48 upon mounting the filter cartridge to the base. The axially spaced edge portions of the primary filter element 74 are secured to the upper underside of the container and the upper surface of the endcap 80 by adhesive such as "Plastisol" adhesive. An upper annular platform formed by the endcap at the bottom of the coalescing chamber 78 includes a plurality of angularly spaced apertures 90. The coalesced water droplets drop through the apertures 90 from chamber 78 and are collected in the sumps 42 and 44 as will be described hereinafter.

A secondary filter element 92 having a continuous fan-shaped, pleated configuration extends from the underside surface of endcap 80. The upper peripheral edges of the filter element 92 retainably abut against shoulder 84 of the endcap 80. A secondary stage endcap 94 encloses the axial end of the filter element 92. Endcap 94 includes a peripheral flange which is upturned so as to retainably engage the peripheral edges of the filter element. A circular opening 96 through the central portion of the endcap receives an elastomeric sealing grommet 98. Sealing grommet 98 is dimensioned and positioned for fluidly sealing against the outer sleeve 50 when the filter cartridge is mounted to the base. Adhesive such as "Plastisol" adhesive is applied to the end portions of filter element 92 for securing the filter element to endcaps 80 and 94.

The exterior surfaces of the secondary filter element 92 function as a water barrier which prevents water passage to the central chamber 95 defined between endcaps 80 and 94. Secondary filter element 92 may be comprised of a porous substance which is saturated with silicon so as to form the exterior water barrier. In the unmounted state such as illustrated in FIGS. 1 and 5, a substantial portion of the exterior surface of filter element 92 is exposed at the underside of the container 70.

The top cover of container 70 also includes a circular opening through which a valve body 100 is inserted. The valve body 100 is sealed to the container with adhesive. A releasable air vent valve 102 is positionable in the valve body. The air vent valve functions to controllably release air from the interior of the fuel filter. The air vent valve 102 may be removed from the valve body 100 and re-inserted into the valve body of a new cartridge upon replacement of a spent cartridge.

In practice, the disposable filter cartridge 14 is mounted to the base 12 by forcing the cartridge over the sleeves 48 and 50 of the base so that the elastomeric grommets 88 and 98 seal against the respective sleeves 48 and 50. The underside of end plate engages lip 64 of the base. The retaining collar 62 is then threaded to the base and engageable against the container 70 to secure the cartridge in a fluid tight relationship with the base. The fuel filter assembly may be suitably mounted to the vehicle by means of a bracket 104 having cooperative shoulders which receive a clamp ring 106. A bolt (not illustrated) extends between aligned openings of the clamp ring and an opening in the bracket for securing the clamp ring to the bracket. The clamp ring 106 surrounds and clampingly engages a recessed neck 108 of the base for securing the base in position.

Figure 2:
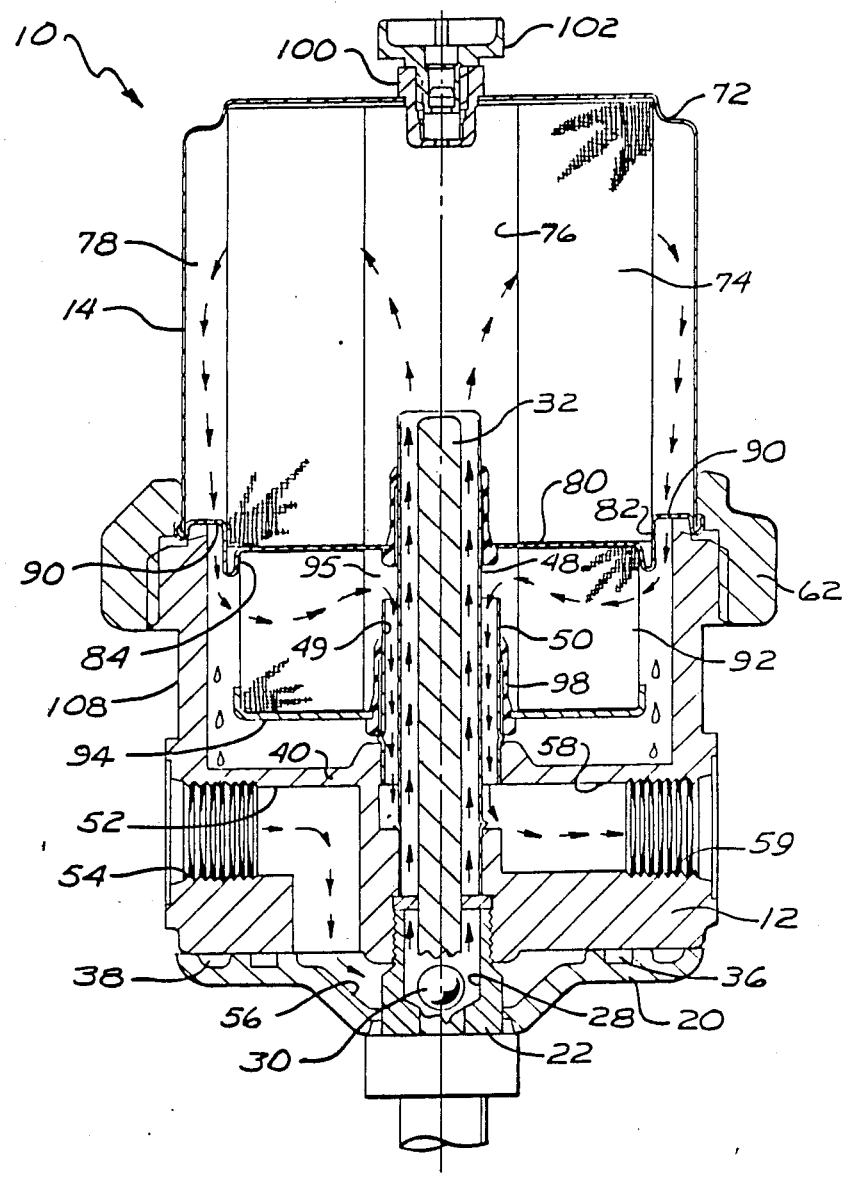
FIG. 2 is a sectional view of the assembled fuel filter assembly of FIG. 1.
Figure 3:
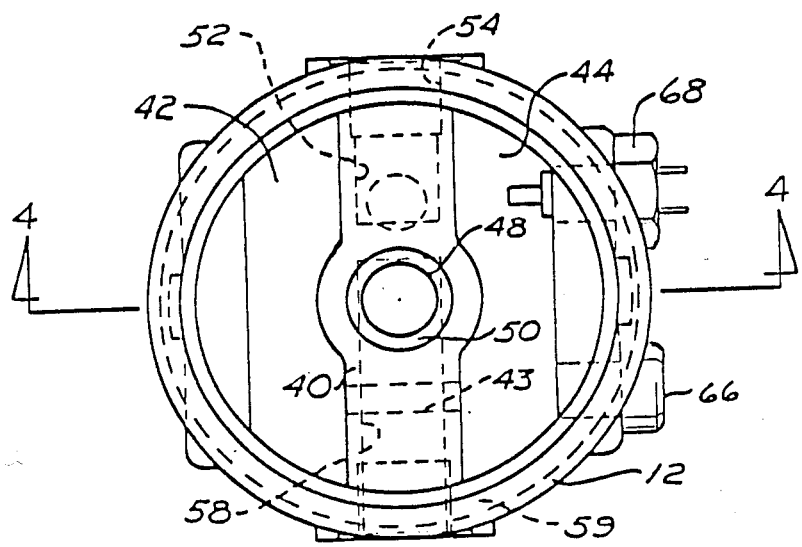
FIG. 3 is a top plan view of the base portion of the fuel filter assembly of FIG. 2, said base portion being rotated 90° to the orientation of FIG. 2.
Figure 4:
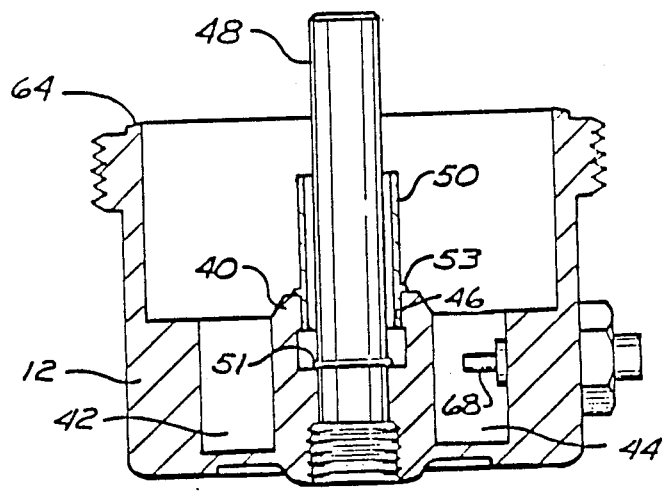
FIG. 4 is a cross sectional view of the base portion taken along the line 4—4 of FIG. 3.

The flow path of fuel through the filter assembly is illustrated by the arrows in FIG. 2. In operation, fuel is supplied to the inlet passage 52 for traversal through annulus 56 and opening 26 via check valve 30 to the heat chamber 28. The fuel then flows axially through sleeve 48 in close proximity to heat rod 32 so that the fuel may be heated if required. The fuel continues axially upwardly (in the direction of the arrows in FIG. 2) into the primary chamber 76 for outward traversal through the primary filter element 74. The filter element 74 functions to remove particulate matter from the fuel. The particulate matter is entrapped on the upstream side of the primary filter element 74. The fuel passes into the coalescing chamber 78 wherein water coalesces as droplets from the fuel and passes along with the fuel through apertures 90. The water continues downwardly for collection in the sumps 40 and 42. The secondary stage filter is a water barrier which prevents the entry of water into the secondary stage chamber 95.

The filtered fuel then passes through secondary stage element 92 to the interior chamber 95 for generally axial traversal through passage 49 between sleeves 48 and 50 (as illustrated by the arrows in FIG. 2). The filtered fuel then flows generally radially out the outlet passage 58 for delivery to the fuel injection pump and/or engine.

The foregoing fuel filter assembly 10 provides an efficient means for filtering particulate matter from the fuel, for removing water from the fuel and for heating the fuel if required to a sufficient temperature to prevent the precipitation of wax crystals. Furthermore, the filter cartridge 14 is disposable so that when the effectiveness of the filter cartridge is expended, a new cartridge may be mounted in place as required. The retaining collar 62 is threadably loosened, the releasable air vent 102 is removed from the cartridge element, and a new cartridge is suitably secured in position.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   base means comprising a base having a fuel inlet passage, a fuel outlet passage, central first conduit means for interiorly defining a first axial passage communicatable with said inlet passage and second conduit means surrounding said first conduct means for defining a second axial passage communicating with said outlet passage, said base means comprising sump means for collecting water;
   filter cartridge means mountable on said base means for removing particulate matter and water from fuel, said cartridge means comprising:
   housing means;
   primary filter means enclosed in said housing means comprising a folded primary filter element defining a first chamber communicating with said first axial passage and a second chamber surrounding said first chamber;
   secondary filter means comprising a secondary filter element extending exteriorly of said housing means and defining with said base means a third chamber and a fourth chamber surrounded by said third chamber, said third chamber communicating with and axially disposed between said second chamber and said sump means, said fourth chamber communicating with said second conduit passage.

2. The fuel filter assembly of claim 1 wherein said first and second axial passages are coaxial.

3. The fuel filter assembly of claim 1 wherein said housing means comprises a first endcap defining a first opening dimensioned to receive said first conduit means and further comprising first sealing means for fluidly sealing said endcap with said first conduit means.

4. The fuel filter assembly of claim 3 further comprising a second endcap axially spaced from said first endcap, said secondary filter element being disposed between said first and second endcaps.

5. The fuel filter assembly of claim 4 wherein said second endcap defines a second opening dimensioned to receive said second conduit means and further comprising second sealing means for fluidly sealing said second endcap to said second conduit means.

6. The fuel filter assembly of claim 3 wherein said first endcap defines a plurality of angularly spaced apertures to provide fluid communication between said second and third chambers.

7. The fuel filter assembly of claim 1 further comprising heat means comprising a heat rod extending axially in said first conduit means for heating fuel.

8. The fuel filter assembly of claim 1 wherein said secondary filter element is generally impervious to the passage of water therethrough.

9. The fuel filter assembly of claim 1 wherein said inlet passage defines an inlet port and said outlet passage defines an outlet port, said ports being diametrally opposed.

10. The fuel filter assembly of claim 9 wherein said sump means comprises a pair of sump sections, said inlet and outlet passages being disposed between said sump sections.

11. The fuel assembly of claim 1 further comprising water level sensor means disposed in said sump means.

12. The fuel filter assembly of claim 1 further comprising drain means for draining said sump means.

13. A fuel filter cartridge comprising:
container means for forming a housing having an at least partially closed first end and axially spaced second end;
primary filter means disposed in said housing comprising a first filter element having water coalescing properties defining a central inner region on one side of said element and an outer region on the opposing side of said element;
first endcap means connecting said second end to and enclosing said first filter element within said housing, said first endcap means defining a first central opening, first sealing means received in said first opening for fluidly sealing a conduit received through said first opening;
secondary filter means disposed axially from said primary filter means and exteriorly of said housing comprising a second filter element which is generally impervious to the passage of water therethrough and defining a central inner region;
second endcap means enclosing an axial end of said second filter element, said endcap means defining a second central opening coaxial with said first opening, second seal means received in said second opening for fluidly sealing a second conduit received through said second opening.

14. The fuel filter cartridge of claim 13 wherein said first filter element has coalescing means for coalescing water passing therethrough.

15. The fuel filter cartridge of claim 13 wherein said first endcap means defines a plurality of angularly spaced apertures.

16. The fuel filter cartridge of claim 13 wherein said first and second filter elements have a continuous folded configuration.

17. The fuel filter cartridge of claim 13 wherein said first end cap means comprises a plate which is bent to form a first shoulder which engages peripheral edge portions of the first element and a second shoulder which engages peripheral edge portions of the second element.

18. A fuel filter assembly comprising:
base means comprising a base having a fuel inlet passage, a fuel outlet passage, central first conduit means for interiorly defining a first axial passage communicatable with said inlet passage and second conduit means surrounding said first conduit means for defining a second axial passage communicating with said outlet passage, said base means comprising sump means for collecting water;
filter cartridge means mountable on said base means for removing particulate matter and water from fuel, said cartridge means comprising:
housing means comprising a first endcap defining first opening means for receiving said first conduit means in fluid tight relationship;
primary filter means enclosed in said housing means comprising a folded primary filter element having water coalescing properties defining a first chamber communicating with said first axial passage and a second chamber surrounding said first chamber;
secondary filter means comprising a second endcap defining second opening means for receiving said second conduit means in fluid tight relationship and comprising a secondary filter element which is generally impervious to the passage of water extending exteriorly of said housing means between said first and second endcaps and defining with said base means a third chamber and a fourth chamber surrounded by said third chamber, said third chamber communicating with said second chamber and said sump means, said fourth chamber communicating with said second axial passage.

19. The fuel filter assembly of claim 18 further comprising heating means mounted to said base means for heating fuel, said heating means comprising a heat rod extending axially in said first conduit means.

20. The fuel filter assembly of claim 18 wherein said sump means comprises two sump sections and said inlet passage, outlet passage, first conduit means and second conduit means are generally disposed between said sump sections.

* * * * *